US009178899B2

(12) United States Patent
Baikalov

(10) Patent No.: US 9,178,899 B2
(45) Date of Patent: Nov. 3, 2015

(54) DETECTING AUTOMATED SITE SCANS

(71) Applicant: Bank of America Corporation, Charlotte, NC (US)

(72) Inventor: Igor A. Baikalov, Thousand Oaks, CA (US)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 14/012,671

(22) Filed: Aug. 28, 2013

(65) Prior Publication Data

US 2015/0067848 A1  Mar. 5, 2015

(51) Int. Cl.
*G06F 11/00* (2006.01)
*G06F 12/14* (2006.01)
*G06F 12/16* (2006.01)
*G08B 13/00* (2006.01)
*H04L 29/06* (2006.01)

(52) U.S. Cl.
CPC ........ *H04L 63/1416* (2013.01); *H04L 63/1491* (2013.01)

(58) Field of Classification Search
CPC .................................. H04L 63/1416
USPC .......................................................... 726/23
See application file for complete search history.

(56) References Cited

U.S. PATENT DOCUMENTS

2005/0210534 A1*  9/2005  Krishnamurthy ............... 726/23
2013/0263226 A1* 10/2013  Sudia ................................ 726/4
2013/0276125 A1* 10/2013  Bailey ............................ 726/25

OTHER PUBLICATIONS

Artem Dinaburg; Ether: Malware Analysis via Hardware Virtualization Extensions; Year:2008; ACM; p. 1-12.*

* cited by examiner

*Primary Examiner* — Monjour Rahim
(74) *Attorney, Agent, or Firm* — Banner & Witcoff, Ltd.; Michael A. Springs

(57) ABSTRACT

Automated site scans are often seen as precursors to a cyber attack, from URI enumeration and version mapping to timing scans used to identify the most valuable DDoS targets. Disclosed are methods and apparatuses for detecting automated site scans and identifying the source of cyber attacks. Honeypot links are provided on a web page via a server. If multiple honeypot links are selected by a visitor of the web page, the server may identify the visitor as an automated system and generate a session ID. The server induces an artificial delay prior to displaying the data associated with the selected honeypot link. After a subsequent attack, the server is able to identify the attacker by association with the stored session ID of an automated site scan.

19 Claims, 3 Drawing Sheets

DETECTING AUTOMATED SITE SCANS

TECHNICAL FIELD

Aspects of the disclosure relate generally to detecting automated site scans. In particular, various aspects of the disclosure relate to methods and apparatuses for detecting the source of a cyber attack by identifying the origin of an automated site scan.

BACKGROUND

Automated site scans are often seen as precursors to the attack, from URI enumeration and version mapping to timing scans to identify the best Distributed Denial of Service (DDoS) targets. Detecting site scans in a heavy traffic customer-facing website is extremely challenging, and prone to both false negatives (missing actual scans) and false positives (tagging legitimate traffic). Moreover, detecting the origin of an attack when the origin of the prior site scan is unknown is often nearly impossible, particularly when the attack comes from thousands of various sources. Thus, there is a need for a method for detecting automated site scans and linking the origin of such scan (which often can be more easily discernible than the origin of massively distributed attack) to the subsequent attack.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a computer-implemented method comprising: providing, from a server, a plurality of honeypot links; detecting, at the server, that at least two of the plurality of honeypot links have been selected by a computer; generating, at the server, a session ID associated with the computer and the selected honeypot links; storing, at the server, the session ID; displaying, from the server, data in response to each selected honeypot link, wherein the data is displayed after an artificial delay; determining, at the server, that the computer is an origin of an attack, wherein the determining is performed by comparing the selected links associated with the session ID with the links targeted in the attack to determine the similarities.

Certain other aspects disclose a non-transitory computer-readable storage medium having computer-executable program instructions stored thereon that, when executed by a processor, cause the processor to: provide, from a server, a plurality of honeypot links; detect, at the server, that at least two of the plurality of honeypot links have been selected by a computer; generate, at the server, a session ID associated with the computer and the selected honeypot links; store, at the server, the session ID; display, from the server, data in response to each selected honeypot link, wherein the data is displayed after an artificial delay; determine, at the server, that the computer is an origin of an attack, wherein the determining is performed by comparing the selected links associated with the session ID with the links targeted in the attack to determine the similarities.

Further aspects disclose apparatus comprising: a memory; a processor, wherein the processor executes computer-executable program instructions which cause the processor to: provide a plurality of honeypot links; detect, at the server, that at least two of the plurality of honeypot links have been selected by a computer; generate a session ID associated with the computer and the selected honeypot links; store, at the memory, the session ID; display data in response to each selected honeypot link, wherein the data is displayed after an artificial delay; determine that the computer is an origin of an attack, wherein the determining is performed by comparing the selected links associated with the session ID with the links targeted in the attack to determine the similarities.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, sever to explain principles of the disclosure. In the drawings:

DETAILED DESCRIPTION

In accordance with various aspects of the disclosure, methods, non-transitory computer-readable media, and apparatuses are disclosed for detecting automated site scans. In certain aspects, when a server receives data from a computing device, the server processes and analyzes the data. The automated process may utilize various hardware components (e.g., processors, communication servers, memory devices, and the like) and related computer algorithms to generate image data related to the agency's business data.

Figure 1:
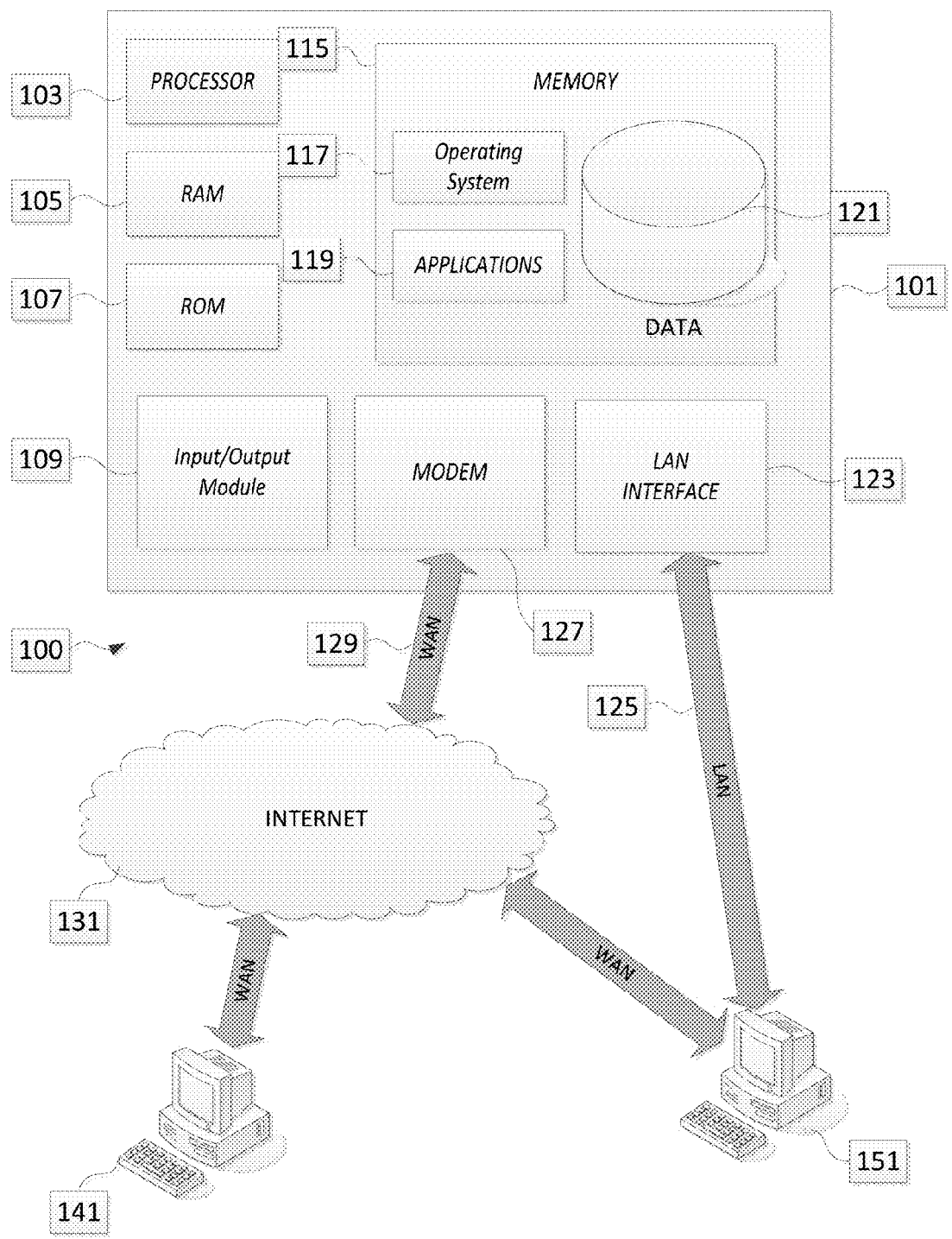
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include a server 101 wherein the processes discussed herein may be implemented. The server 101 may have a processor 103 for controlling the overall operation of the server 101 and its associated components, including random-access memory (RAM) 105, read-only memory (ROM) 107, communications module 109, and memory 115. Processor 103 and its associated components may allow the server 101 to run a series of computer-readable instructions related to receiving, storing, and analyzing data to determine an event's risk level.

Server 101 typically includes a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Communications module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 1141, 151, and 161. The computing devices 141, 151, and 161 may be personal computing devices or servers that include many or all of the elements described above relative to the server 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, server 101 may be connected to the LAN 125 through a network interface or adapter in the communications module 109. When used in a WAN networking environment, the server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate on web pages.

Additionally, one or more application programs 119 used by the server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
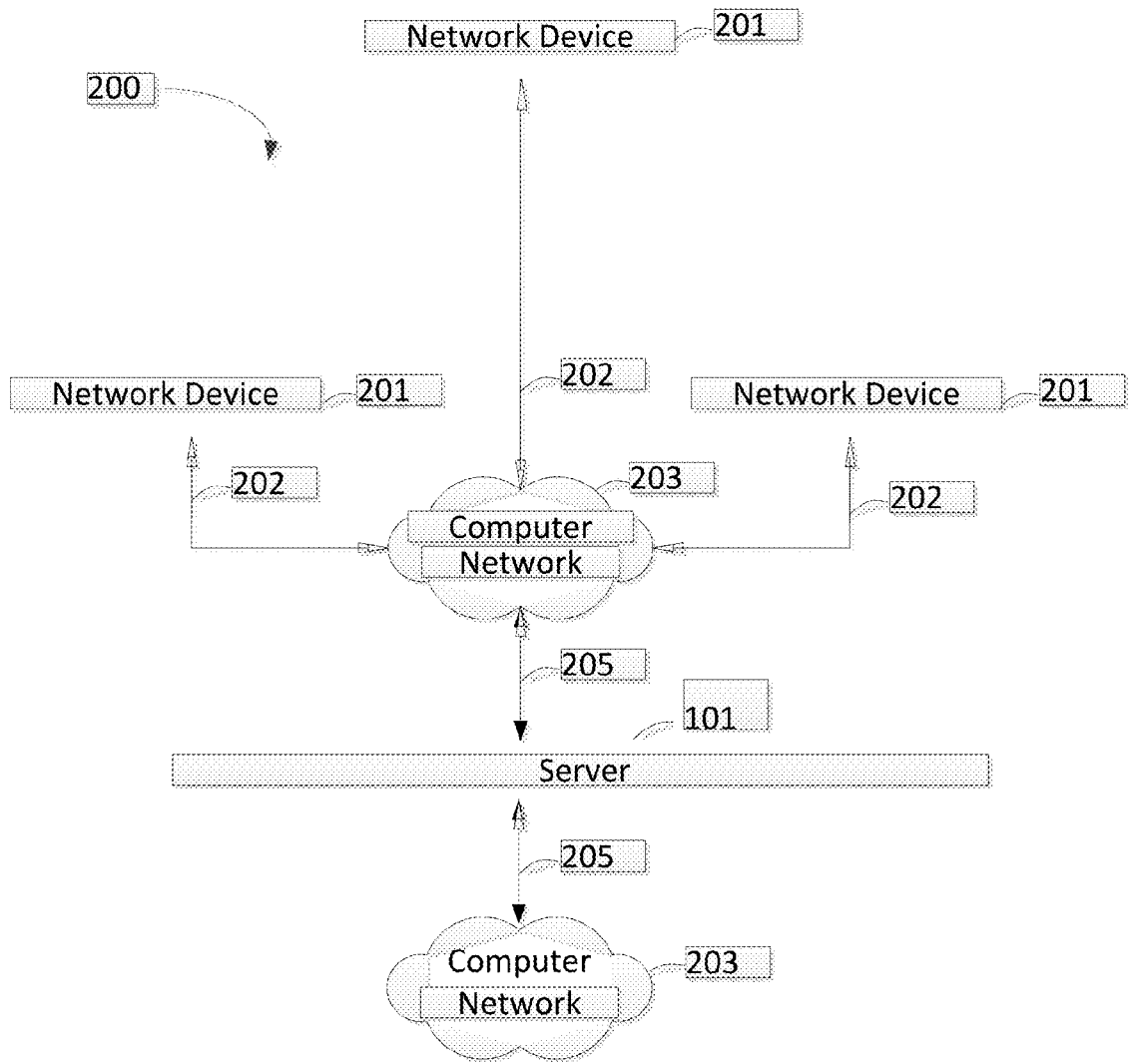
FIG. 2 shows an illustrative shows an illustrative block diagram of workstations and servers that may be used to implement the processes and function of one or more aspects of the present disclosure.

FIG. 2 illustrates another example operating environment in which various aspects of the disclosure may be implemented. As illustrated, system 200 may include one or more workstations 201. Workstations 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more workstations 201 may be located within a branch office of a financial institution. Such workstations may be used, for example, by customer service representatives, other employees, and/or customers of the financial institution in conducting financial transactions via network 203. Additionally or alternatively, one or more workstations 201 may be located at a user location (e.g., a customer's home or office). Such workstations also may be used, for example, by customers of the financial institution in conducting financial transactions via computer network 203.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between workstations 201 and server 204, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

Figure 3:
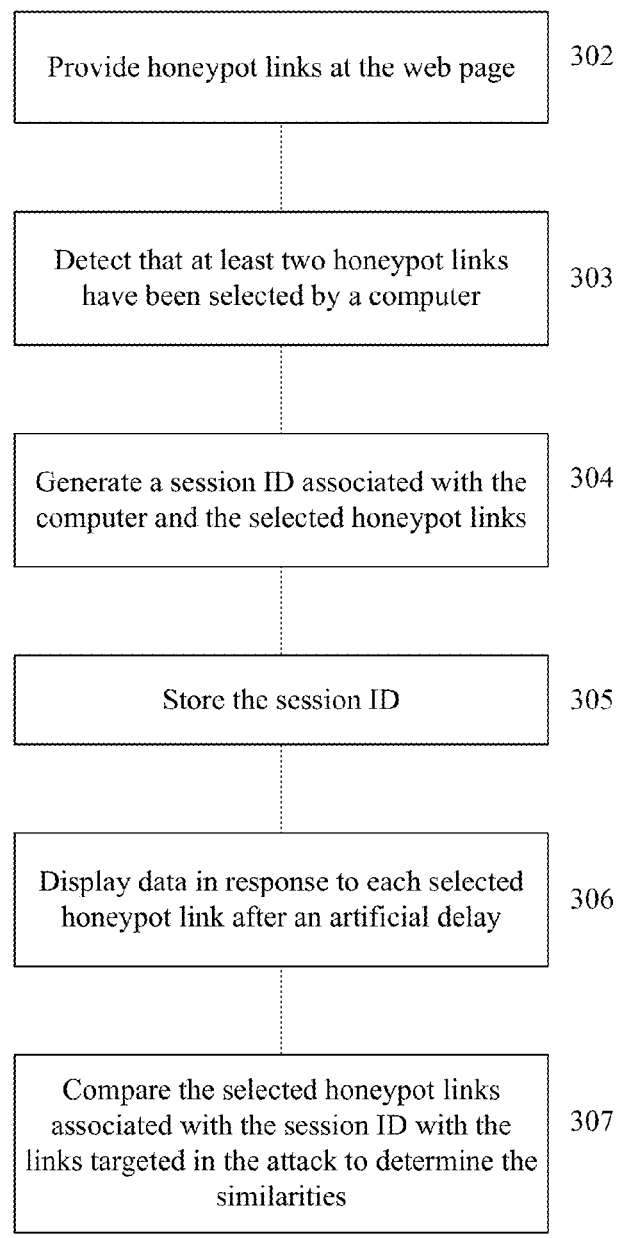
FIG. 3 shows an illustrative embodiment of a flow chart in accordance with aspects of the disclosure.

FIG. 3 illustrates a flow chart of an exemplary method in accordance with certain aspects of the disclosure. As shown in FIG. 3, the method may begin at step 302 by providing honeypot links on a web page. Specifically, server 101 may add honeypot links to a web page. Honeypot links, as herein described, may refer to invisible or low visibility links that may be placed on a web page to detect automated site scans. Honeypot links are placed on a web page in such a way as to differentiate between human visitors of the web page and software robots programmed to simulate human visitors. The server 101 may add honeypot links to a web page in various forms, including blank Graphic Interchange Formats (GIFs), horizontal lines, and separators between standard links, for example. Server 101 may insert one or a plurality of honeypot links in one or more web pages.

In some aspects, server 101 may implement the honeypot links using negative CAPTCHA (Completely Automated Public Turing test to tell Computers and Humans Apart) cloaking. Negative CAPTCHA cloaking may make honeypot links invisible or hardly visible to human visitors of a web site, yet still accessible to automated scanners. Traditional CAPTCHA may challenge visitors of a web page with various tests or questions. If the visitor answers correctly, he or she may proceed to the web page. Often, however, automated systems are unable to solve or maneuver beyond the CAPTCHA to access the web page. Thus, CAPTCHA may allow users to access a web page only after they have proved they are human. Negative CAPTCHA may work in reverse and trick automated scanners to reveal they are not human. For instance, server 101 may use negative CAPTCHA to include forms in a web page that are not visible to human visitors of the web page. Automated scanners, however, may detect and fill in the forms with some information. Therefore, server 101 may be able to identify automated scanners when the negative CAPTCHA forms include the inputted information.

In some aspects, honeypot links may be associated with a unique identifier. Server 101 may generate a unique identifier for each honeypot link at processor 103. Memory 115 may store the unique identifiers and associated honeypot links in database 121. For example, database 121 may store a table which lists each unique identifier by row with the link name associated with the unique identifier. Moreover, server 101 may monitor and store the IP addresses of computers that select a honeypot link. The IP addresses may also be stored in database 121. Thus, database 121 may store a record of the honeypot links selected at a particular IP address.

After server 101 inserts honeypot links to be provided on a web page at step 302, the exemplary method shown in FIG. 3 may then move to step 303, where server 101 detects whether a computer has selected at least two honeypot links. As discussed above, server 101 may monitor and detect whether a computer has selected a honeypot link. In some aspects, when a honeypot link is selected, server 101 may receive notification of the selection via communications module 109. The notification may be in the form of a request for the data associated with the link, or some other notification that will alert server 101 that a particular honeypot link has been selected.

Server 101 may keep a record of the number of times that a computer from a certain IP address selects a honeypot link. Server 101 may store this information in memory 115. For example, database 121 may store in a table the number of times a computer with a particular IP address has selected any of the honeypot links provided on a web page or set of web pages. In certain aspects, processor 103 may update the count associated with each IP address.

At step 303, processor 103 may detect that a computer has selected at least two honeypot links. In certain other aspects, processor 103 may detect that a computers has selected honeypot links any predetermined amount of times. The predetermined amount may be any number of times that may differentiate human visitors to a web site from automated systems. Although honeypot link may be invisible to human visitors, there is still a possibility that they may select a honeypot link, most likely accidentally. Automated systems, particularly those performing site scans, may likely select each of the honeypot links, which will appear to automated system to be the same as the other standard links on the web page. Therefore, when a server 101 detects that a computer has selected multiple honeypot links on a web page, server 101 may recognize the computer as an automated system.

After server 101 detects that a computer has selected at least two honeypot links, processor 103 may generate a session ID associated with the computer and the selected honeypot links at step 304. In some aspects, the session ID may be any form of identification that tracks a computer's traversal through a website. The session ID may record the computer's location, for example the computer's IP address, along with the links selected from the computer. In certain aspects, the session ID may only identify the honeypot links selected from the computer. In certain other aspects, the session ID may identify all links selected from the computer.

At step 305, server 101 may store the session ID in memory 115. The session ID may be stored in a table in database 121. Therefore, server 101 may be able to retrieve a particular session ID to determine the honeypot links that were selected from a computer at a certain IP address. Similarly, server 101 may view which honeypot links were selected, as stored in memory 115, to determine the IP addresses of the computers selecting those honeypot links.

The method illustrated in FIG. 3 may, following step 305, proceed to step 306. At step 306, server 101 may provide data to be displayed on a web page in response to a selected honeypot link after an artificial delay. The displayed data may include one or more of a document, images, a new web page, audio, or any other types of data typically displayed after a link is selected. In certain aspects, the data may include blank documents or empty fields. The data may be void of any links to other data on the website so as to isolate a potential attacker's threat when selecting a honeypot link. For example, the displayed data may be a blank web page with no links to other data on the web site. Therefore, when an attacker selects a honeypot link, the corresponding data does not direct the attacker to other valuable information on the web site.

According to another aspect of the disclosure, server 101 induces an artificial delay prior to providing data for display after a honeypot link is selected. A benefit for inducing the artificial delay is to create the illusion that the data associated with a selected honeypot link is an expensive resource. Prior to performing a cyber attack on a web site, such as a DDoS attack, the attackers may often perform a timing scan (e.g., a particular type of automated site scan) of the web site. A primary goal of the timing scan is to identify the links that correspond the site's most expensive resources, i.e. the most valuable or critical data on the site. One indicator that automated systems often use to detect value of a site's resources is the time it takes for data to be provided after a link is selected. Generally, a system performing a timing scan will treat resources as more expensive when the delay between selecting the link and providing the corresponding data is longer. For example, if it takes ten seconds to display the corresponding data after link A is selected, and it takes five seconds to display the corresponding data after link B is selected, the system performing a timing scan may consider link A to be directed to more expensive resources than link B.

After the timing scan is complete, the automated system often generates a DDoS target list. The DDoS target list may list a web site's links in order of value as determined from the timing scan. The most expensive resources may be listed first, and may therefore be the attacker's primary DDoS targets.

By inducing an artificial delay in providing data for display after a honeypot link is selected, server 101 increases the value of the corresponding data from the automated system's perspective. In some aspects, the artificial delay for each honeypot link may be such that each honeypot link has a longer delay than any standard link (i.e. the normal, visible links on a web page which link to actual site resources) on the web site. This may be achieved at processor 103 by, first, timing the delays associated with each of the standard links, then inducing an artificial delay for each honeypot link that is longer than the standard link with the longest delay in providing site resources. For example, processor 103 may access each standard link on a web page and determine the time it takes from selection of a standard link to display of the associated data. The web page may consist of standard links X, Y, Z and honeypot links J and K. Standard link X may have a delay of two seconds, standard link Y may have a delay of four seconds, and standard link Z may have a delay of six seconds. Processor 103 may recognize, then, that the longest standard link delay on the web page is six seconds. Therefore, processor 103 may induce an artificial delay for honeypot links J and K of at least six seconds. Thus, systems performing timing scans may determine that honeypot links J and K link to more expensive resources than do standard links X, Y, and Z, and will move the honeypot links to the top of its DDoS target list.

It will be appreciated that server 101 may determine the timing for the artificial delay in other ways. For example, server 101 may induce a predetermined artificial delay for each honeypot link without analyzing the delays associated with the standard links. Server 101 may induce an artificial delay of thirty seconds, as an example, or any other amount of time that will increase the links perceived value to an automated system. Server 101 may induce the same artificial delay for each honeypot link, or provide each honeypot link with a different artificial delay.

The final step in the method illustrated in FIG. 3 may occur after there has been an attack on the web site. At step 307, server 101 may identify the source of the attack by comparing the links targeted in the attack with stored session ID's to determine the similarities between the two. In particular, server 101 may determine whether the links targeted in a DDoS attack, i.e. the perceived most expensive resources, are the same links selected during a prior automated site scan, the session ID of which may be stored in memory 115. Server 101 may then be able to identify the attacker using the session ID.

Determining the source of an attack, such as a DDoS attack, is an arduous, and often impossible task because the attacks tend to occur on a large scale at hundreds or even thousands of locations. Automated site scans are often precursors to an attack, and often originate from a single system. As described previously, it may be much simpler to determine the origin of an automated site scan. By recording and storing the honeypot links selected during an automated site scan, along with the automated system's IP address in a session ID, server 101 may maintain a database of potential attackers and the links they may be likely to attack. If the links targeted in a subsequent attack are the same links selected during an automated site scan, server 101 may review the stored session ID's to determine the IP address of the automated site scan linked to the attack.

Server 101 may determine the amount of links that need to be similar before associated an attack with a stored session ID. Server 101 may set a predetermined amount of links that an attack must first target before the attack is associated with a session ID. For example, server 101 may analyze the first five links targeted in an attack. Server 101 may then analyze stored session ID's and unique identifiers associated with the honeypot links. In this example, if a session ID identifies that an IP address selected the first five honeypot links, server 101 may determine that the attack originated from that IP address. Thus, the disclosed methods and apparatuses are capable of detecting automated site scans and identifying the source of a cyber attack.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A computer-implemented method, comprising:
providing, from a computer server, a plurality of honeypot links in a web page to detect automatic scans;
detecting, at the computer server via a communications module, that at least two of the plurality of honeypot links have been selected by a computer a predetermined number of times;
generating, at the computer server, a session ID associated with the computer and the at least two selected honeypot links;
storing, at the computer server, the session ID;
displaying, from the computer server, data in response to each selected honeypot link, wherein the data is displayed on the web page after an artificial delay, and wherein the data does not include links to other web pages;
determining, at the computer server, that the computer is an origin of an attack, wherein the determining is performed by comparing the selected honeypot links associated with the session ID with the links targeted in the attack to determine the similarities.

2. The method of claim 1, wherein each honeypot link is associated with a unique identifier.

3. The method of claim 1, wherein the session ID is randomly generated at the computer server.

4. The method of claim 1, wherein the honeypot links comprise one or more of blank GIFs, horizontal lines, and separators between standard links.

5. The method of claim 1, wherein the artificial delay is longer than the time it takes to provide resources when standard links are selected.

6. The method of claim 1, wherein the honeypot links comprise negative CAPTCHA cloaking.

7. The method of claim 1, wherein the session ID is associated with the IP address of the computer.

8. A non-transitory computer-readable storage medium having computer-executable program instructions stored thereon that, when executed by a processor, cause the processor to:
provide, from a computer server, a plurality of honeypot links in a web page to detect automatic scans;
detect, at the computer server, that at least two of the plurality of honeypot links have been selected by a computer a predetermined number of times;
generate, at the computer server, a session ID associated with the computer and the at least two selected honeypot links;
store, at the computer server, the session ID;
display, from the computer server, data in response to each selected honeypot link, wherein the data is displayed on the web page after an artificial delay, wherein the data does not include links to other web pages; and
determine, at the computer server, that the computer is an origin of an attack, wherein the determining is performed by comparing the selected honeypot links associated with the session ID with the links targeted in the attack to determine the similarities.

9. The non-transitory computer-readable storage medium of claim 8, wherein each honeypot link is associated with a unique identifier.

10. The non-transitory computer-readable storage medium of claim 8, wherein the session ID is randomly generated at the computer server.

11. The non-transitory computer-readable storage medium of claim 8, wherein the honeypot links comprise one or more of blank GIFs, horizontal lines, and separators between standard links.

12. The non-transitory computer-readable storage medium of claim 8, wherein the artificial delay is longer than the time it takes to provide resources when standard links are selected.

13. The transitory computer-readable storage medium of claim 8, wherein the honeypot links comprise negative CAPTCHA cloaking.

14. The transitory computer-readable storage medium of claim 8, wherein the session ID is associated with the IP address of the computer.

15. An apparatus comprising:
a memory;
a processor, wherein the processor executes computer-executable program instructions which cause the processor to:
provide a plurality of honeypot links in a web page to detect automatic scans;
detect that at least two of the plurality of honeypot links have been selected by a computer a predetermined number of times;
generate a session ID associated with the computer and the at least two selected honeypot links;
store, at the memory, the session ID;
display data in response to each selected honeypot link, wherein the data is displayed on the web page after an artificial delay, wherein the data does not include links to other web pages; and
determine that the computer is an origin of an attack, wherein the determining is performed by comparing the selected honeypot links associated with the session ID with the links targeted in the attack to determine the similarities.

16. The apparatus of claim 15, wherein each honeypot link is associated with a unique identifier.

17. The apparatus of claim 15, wherein the session ID is randomly generated at the computer server.

18. apparatus of claim 15, wherein the honeypot links comprise one or more of blank GIFs, horizontal lines, and separators between standard links.

19. The apparatus of claim 15, wherein the artificial delay is longer than the time it takes to provide resources when standard links are selected.

* * * * *